US012749734B2

(12) United States Patent
Shidore et al.

(10) Patent No.: US 12,749,734 B2
(45) Date of Patent: Sep. 29, 2026

(54) RECHARGEABLE ENERGY STORAGE SYSTEM INCLUDING ENERGY STORAGE CELLS HAVING AN INTERNAL COOLING STRUCTURE

(71) Applicant: GM Global Technology Operations LLC, Detroit, MI (US)

(72) Inventors: Neeraj S. Shidore, Novi, MI (US); Chinmaya Patil, South Lyon, MI (US); Seunghwan Keum, Northville, MI (US); Sanjay K. Mahajan, Bloomfield Hills, MI (US); Madhusudan Raghavan, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 644 days.

(21) Appl. No.: 18/316,551

(22) Filed: May 12, 2023

(65) Prior Publication Data

US 2024/0380025 A1 Nov. 14, 2024

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/653* (2015.04); (Continued)

(58) Field of Classification Search
CPC ........... H01M 10/6556; H01M 10/613; H01M 10/653; H01M 10/6552; H01M 10/625; (Continued)

(56) References Cited

U.S. PATENT DOCUMENTS

| | | | | |
|---|---|---|---|---|
| 8,828,576 | B2 | 9/2014 | Kumar et al. | |
| 10,923,287 | B1 * | 2/2021 | Coppola | H01G 9/08 |

(Continued)

FOREIGN PATENT DOCUMENTS

| | | | |
|---|---|---|---|
| DE | 102012203285 | A1 | 9/2012 |
| DE | 102021121017 | A1 | 2/2023 |

(Continued)

OTHER PUBLICATIONS

English Translation of DE-102012203285-A1 (Year: 2012).*

(Continued)

*Primary Examiner* — Niki Bakhtiari
*Assistant Examiner* — Madison Leigh Kyle
(74) *Attorney, Agent, or Firm* — CANTOR COLBURN LLP

(57) ABSTRACT

A rechargeable energy storage system includes a housing including an interior zone, a coolant member arranged in the interior zone of the housing, and a plurality of energy storage cells arranged in the interior zone on the coolant member. Each of the plurality of energy storage cells includes a cell can defining an energy storage medium housing. The cell can includes a first end supported at the coolant member and a second end. An amount of energy storage medium is arranged in the energy storage medium housing. A heat absorption member extends from the first end toward the second end through the amount of energy storage medium.

20 Claims, 6 Drawing Sheets

(51) Int. Cl.
*H01M 10/653* (2014.01)
*H01M 10/6552* (2014.01)
*H01M 50/213* (2021.01)

(52) U.S. Cl.
CPC ..... *H01M 10/6552* (2015.04); *H01M 50/213* (2021.01); *H01M 2220/20* (2013.01)

(58) Field of Classification Search
CPC ............. H01M 10/643; H01M 10/655; H01M 10/6568; H01M 10/6569; H01M 50/213; H01M 50/502; H01M 2220/20; Y02E 60/10
See application file for complete search history.

(56) References Cited

U.S. PATENT DOCUMENTS

| | | | | |
|---|---|---|---|---|
| 11,329,332 B2* | 5/2022 | Singer | H01M 10/6567 | |
| 2004/0130855 A1* | 7/2004 | Laurila | H01G 9/08 | 361/523 |
| 2017/0005382 A1* | 1/2017 | Kim | H01M 10/0431 | |
| 2017/0331142 A1* | 11/2017 | Nicholls | H01M 10/654 | |
| 2023/0155264 A1* | 5/2023 | Kang | H01M 10/613 | 429/81 |

FOREIGN PATENT DOCUMENTS

| | | | | |
|---|---|---|---|---|
| JP | 2012174344 A | * | 9/2012 | |
| WO | WO-2014167504 A1 | * | 10/2014 | H01M 10/0587 |

OTHER PUBLICATIONS

English Translation of WO-2014167504-A1 (Year: 2014).*
English Translation JP-2012174344-A (Year: 2012).*
German Application No. 10 2023 128 132.1 filed Oct. 14, 2023; German Office Action dated Jun. 14, 2024; 4 pages.
Berg et al. "Durability of lithium-ion 18650 cells under random vibration load with respect to the inner cell design." Journal of Energy Storage 31 (2020): 101499. 33 pages.

* cited by examiner

RECHARGEABLE ENERGY STORAGE SYSTEM INCLUDING ENERGY STORAGE CELLS HAVING AN INTERNAL COOLING STRUCTURE

INTRODUCTION

The subject disclosure relates to the art of rechargeable energy storage systems and, more particularly, to a rechargeable energy storage system for a vehicle including energy storage cells having an internal cooling structure.

Rechargeable energy storage systems (RESS) typically includes one or more battery packs having rechargeable energy storage cells. The battery pack is connectable to a charging system that replenishes electrical energy lost to a load. The charging system may be part of a vehicle, or may be part of an external charging station. When providing power to a vehicle, the battery pack discharges stored electrical energy. Replenishing and discharging the stored electrical energy creates heat which, if not removed, can detract from battery pack efficiency.

There are a wide array of systems employed to cool batteries. For example, many batteries will include a forced air convection system that delivers a flow of air over battery components. Other systems may employ heat sinks that absorb heat from external battery surfaces. Still other systems may employ cold plates. A cold plate is typically formed from aluminum and may include internal passages that circulate a fluid. While existing systems are effective, forced air systems and cold plates lack a desirable efficiency to absorb large amounts of heat that may be produced by larger battery packs. Accordingly, the art would welcome a more efficient heat mitigation system for vehicle battery packs.

SUMMARY

A rechargeable energy storage system, in accordance with a non-limiting example, includes a housing including an interior zone, a coolant member arranged in the interior zone of the housing, and a plurality of energy storage cells arranged in the interior zone on the coolant member. Each of the plurality of energy storage cells includes a cell can defining an energy storage medium housing. The cell can includes a first end supported at the coolant member and a second end. An amount of energy storage medium is arranged in the energy storage medium housing. A heat absorption member extends from the first end toward the second end through the amount of energy storage medium.

In addition to one or more of the features described herein the heat absorption member includes a conduit extending through the amount of energy storage medium.

In addition to one or more of the features described herein the conduit is formed from a thermally conductive material coated with an electrically insulative material.

In addition to one or more of the features described herein the coolant member includes a first surface, a second surface, and a cooling fluid passage arranged between the first surface and the second surface, the cooling fluid passage including an inlet, an outlet, the heat absorption member being in thermally conductive contact with one of the first surface and the second surface.

In addition to one or more of the features described herein the heat absorption member includes a first end portion connected to the first surface of the coolant member and a second end portion terminating in the cell can.

In addition to one or more of the features described herein the heat absorption member includes a first end portion fluidically connected to the cooling fluid passage and a second end portion that extends outwardly of the cell can.

In addition to one or more of the features described herein a fin extends from the one of the first surface and the second surface into the heat absorption member.

In addition to one or more of the features described herein the first end portion is fluidically connected with the cooling fluid passage, the coolant member including one of a heat pipe and a phase change material element that extends between the cooling fluid passage into the conduit.

In addition to one or more of the features described herein the cell can includes an first termina arranged at one of the first end and the second end, and a second termina arranged at the other of the first end and the second end, the heat absorption member extending through each of the first terminal and the second terminal.

In addition to one or more of the features described herein the cell can includes a first terminal arranged at one of the first end and the second end, and a second terminal arranged at the one of the first end and the second end spaced from the first terminal.

A vehicle, in accordance with a non-limiting example, includes a body, an electric motor supported in the body, and a rechargeable energy storage system supported in the body. The rechargeable energy storage system includes a housing including an interior zone, a coolant member arranged in the interior zone of the housing, and a plurality of energy storage cells arranged in the interior zone on the coolant member. Each of the plurality of energy storage cells includes a cell can defining an energy storage medium housing. The cell can includes a first end supported at the coolant member and a second end. An amount of energy storage medium is arranged in the energy storage medium housing. A heat absorption member extends from the first end toward the second end through the amount of energy storage medium.

In addition to one or more of the features described herein the heat absorption member includes a conduit extending through the amount of energy storage medium.

In addition to one or more of the features described herein the conduit is formed from a thermally conductive material coated with an electrically insulative material.

In addition to one or more of the features described herein the coolant member includes a first surface, a second surface, and a cooling fluid passage arranged between the first surface and the second surface, the cooling fluid passage including an inlet, an outlet, the heat absorption member being in thermally conductive contact with one of the first surface and the second surface.

In addition to one or more of the features described herein the heat absorption member includes a first end portion connected to the first surface of the coolant member and a second end portion terminating in the cell can.

In addition to one or more of the features described herein the heat absorption member includes a first end portion fluidically connected to the cooling fluid passage and a second end portion that extends outwardly of the cell can.

In addition to one or more of the features described herein a fin extending from the one of the first surface and the second surface into the heat absorption member.

In addition to one or more of the features described herein the first end portion is fluidically connected with the cooling fluid passage, the coolant member including one a heat pipe and a phase change material element that extends between the cooling fluid passage into the conduit.

In addition to one or more of the features described herein the cell can includes a first terminal arranged at one of the first end and the second end, and a second terminal arranged at the other of the first end and the second end, the heat absorption member extending through each of the first terminal and the second terminal.

In addition to one or more of the features described herein the cell can includes a first terminal arranged at one of the first end and the second end, and a second terminal arranged at the one of the first end and the second end spaced from the first terminal.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
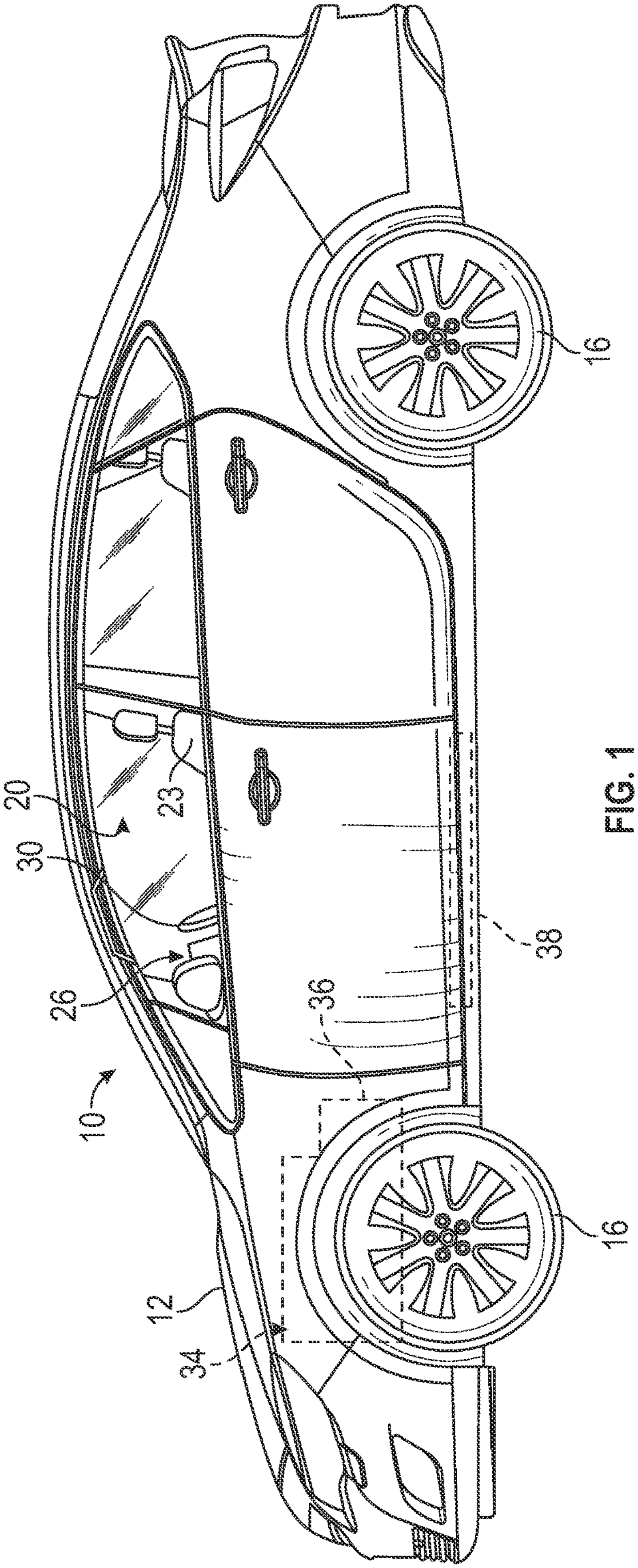
FIG. 1 is a left side view of a vehicle including a rechargeable energy storage system including a coolant member and a plurality of energy storage cells provided with an internal cooling structure, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s). Vehicle 10 includes an electric motor 34 connected to a transmission 36 that provides power to one or more of the plurality of wheels 16.

Figure 2A:
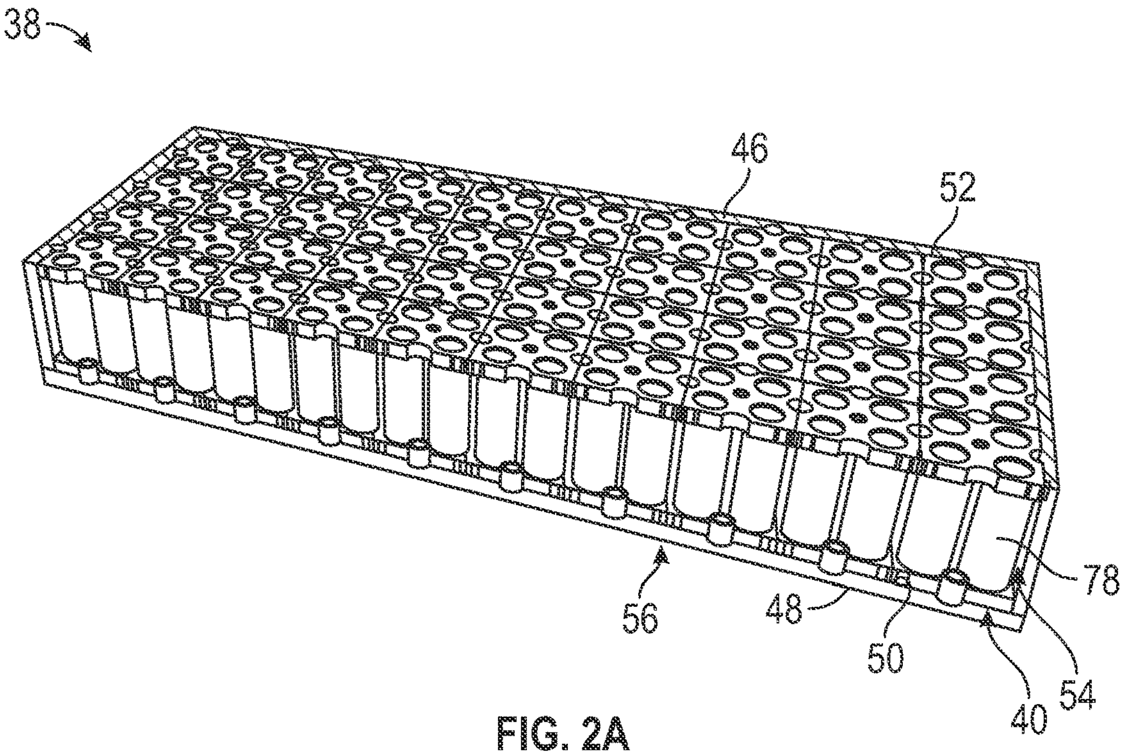
FIG. 2A is a view of the rechargeable energy storage system (RESS) of FIG. 1, in accordance with a non-limiting example.

A rechargeable energy storage system (RESS) 38 is arranged in body 12 and provides power to electric motor 34. At this point, it should be understood that the location of electric motor 34, transmission 36, and RESS 38 in body 12 may vary. Referring to FIG. 2A, RESS 38 includes a plurality of battery packs, one of which is indicated at 40. RESS 38 includes a housing 46 having a base portion 48 including an inner surface 50, and a cover 52 that define an interior zone 54 within which is arranged the plurality of battery packs 40.

Figure 2B:
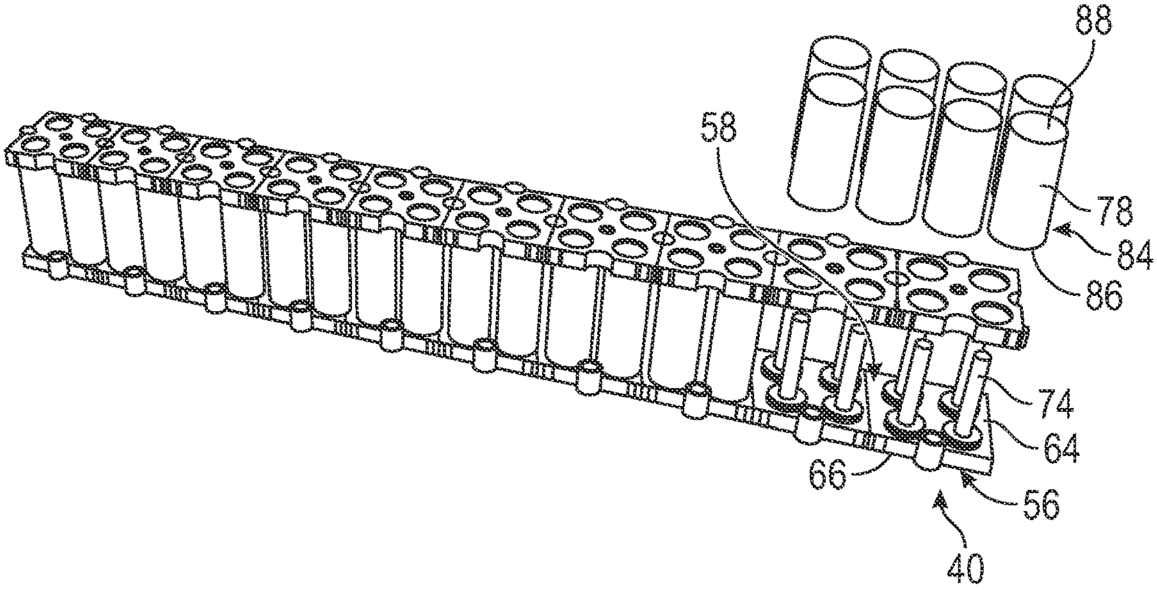
FIG. 2B depicts a battery pack of the RESS of FIG. 2A, in accordance with a non-limiting example.
Figure 3:
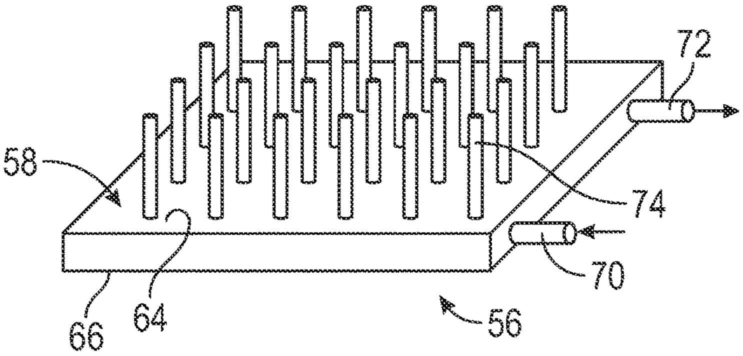
FIG. 3 is a perspective view of the coolant member, in accordance with a non-limiting example.
Figure 5:
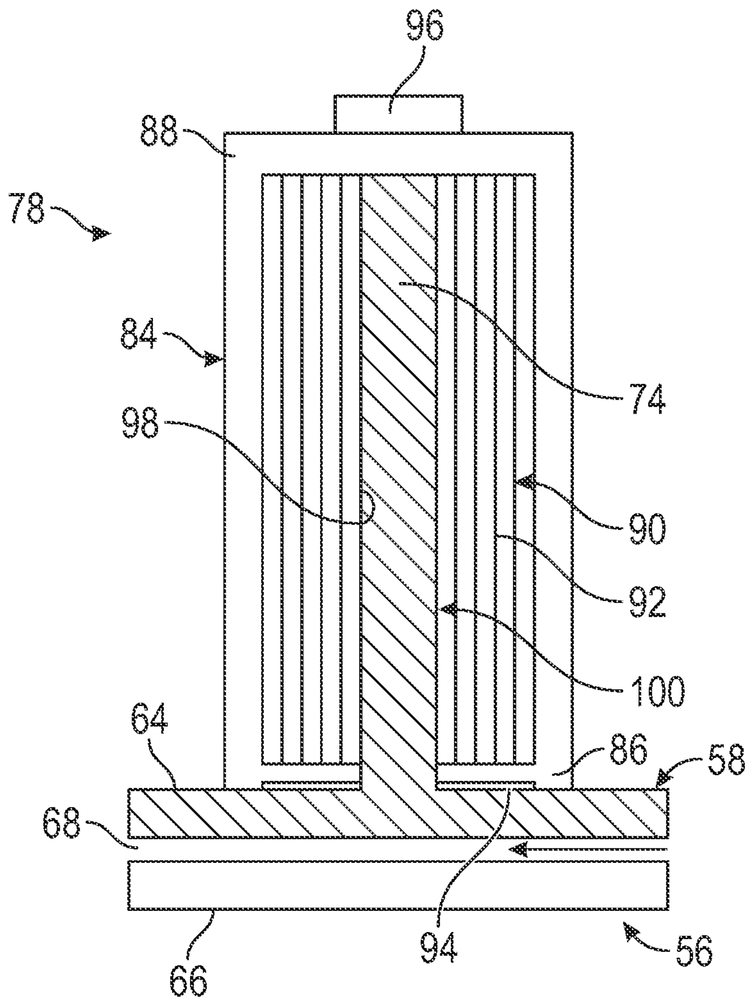
FIG. 5 is a cross-sectional view of an energy storage cell provided with an internal cooling structure connected to the coolant member, in accordance with a non-limiting example.

RESS 38 includes a coolant member 56, FIG. 2B, arranged on inner surface 50 in interior zone 54. Coolant member 56 is in thermal contact with each of the plurality battery packs 40. That is, each battery pack 40 includes a corresponding coolant member 56. Of course, it should be understood, that multiple battery packs 40 could share a single coolant member 56 or multiple coolant members 56 may be associated with each battery pack 40. As shown in FIG. 3 and continued reference to FIG. 2B, coolant member 56 includes a plate 58 having a first surface 64 and a second surface 66 that is opposite first surface 64. A cooling fluid passage 68, FIG. 5, is defined between first surface 64 and second surface 66. Cooling fluid passage 68 includes an inlet 70 and an outlet 72. A plurality of fins, one of which is indicated at 74 extend from first surface 64.

Figure 4:
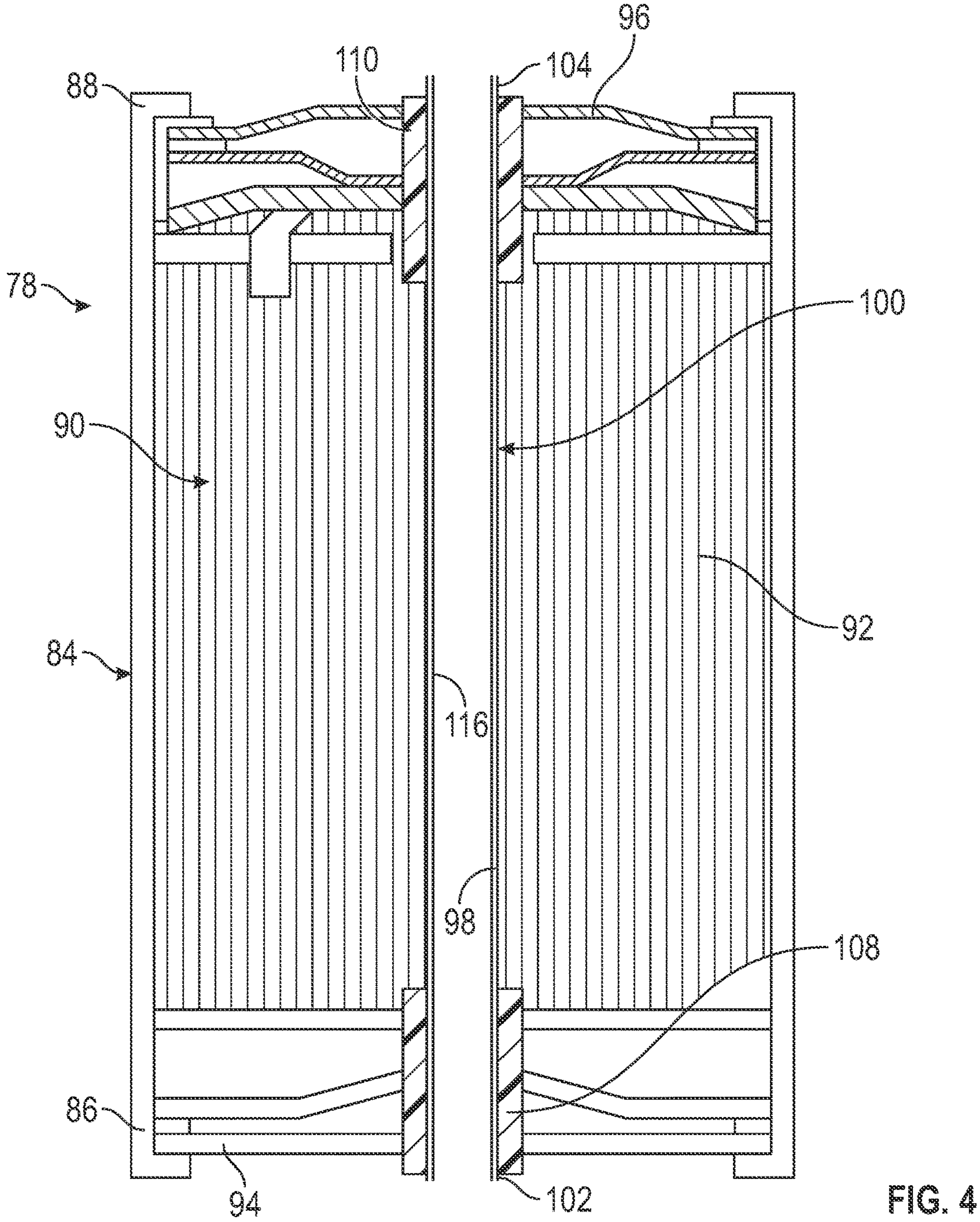
FIG. 4 is a cross-sectional view of one of the plurality of energy storage cells provided with an internal cooling structure, in accordance with a non-limiting example.

In a non-limiting example, each battery pack 40 is formed from multiple energy storage cells, one of which is indicated at 78 in FIG. 2A. Each energy storage cell 78 includes a cell can 84 having a first end 86 and a second end 88 as shown in FIG. 4. An energy storage medium housing 90 is defined between first end 86 and second end 88. An amount of energy storage medium 92 is arranged in energy storage medium housing 90. The particular chemistry associated with energy storage medium 92 arranged in energy storage medium housing 90 may vary. A first terminal 94 which may take the form of an anode (not separately labeled) is arranged at first end 86 and a second terminal 96 which may take the form of a cathode (also not separately labeled) is arranged at second end 88. A passage 98 extends between and through first terminal 94 and second terminal 96.

In accordance with a non-limiting example shown in FIG. 4, a heat absorption member 100 extends through passage 98 of cell can 84. Heat absorption member 100 absorbs heat from the energy storage medium 92. Alleviating a heat load from energy storage medium 92 improves an overall operational efficacy of each energy storage cell 78 and decreases the thermal gradient across cell can 84 in a radial direction resulting in improved cell life. Heat absorption member 100 includes a first end portion 102 and a second end portion 104. Heat absorption member 100 is formed from a material that readily absorbs heat energy such as various metals and metal alloys.

In the non-limiting example shown in FIG. 4, first end portion 102 projects through first terminal 94 and second end portion 104 projects through second terminal 96. A first insulator 108 is arranged at first end portion 102 and a second insulator 110 is arranged at second end portion 104. First insulator 108 electrically isolates heat absorption member 100 from first terminal 94 and second insulator 110 electrically isolates heat absorption member 100 from second terminal 96. In a non-limiting example, heat absorption member 100 defines a conduit 116 that extends between first end portion 102 and second end portion 104. Heat absorption member 100 and, by extension conduit 116, may be coated with an electrically insulative material (not separately labeled) and is receptive of fin 74 extending from coolant member 56. In one non-limiting example, second end portion 104 of heat absorption member 100 is open such that fin 74 may pass completely through energy storage cell 78. In another non-limiting example, second end portion 104 may be closed off yet still be receptive of fin 74 such as shown in FIG. 5.

Figure 6:
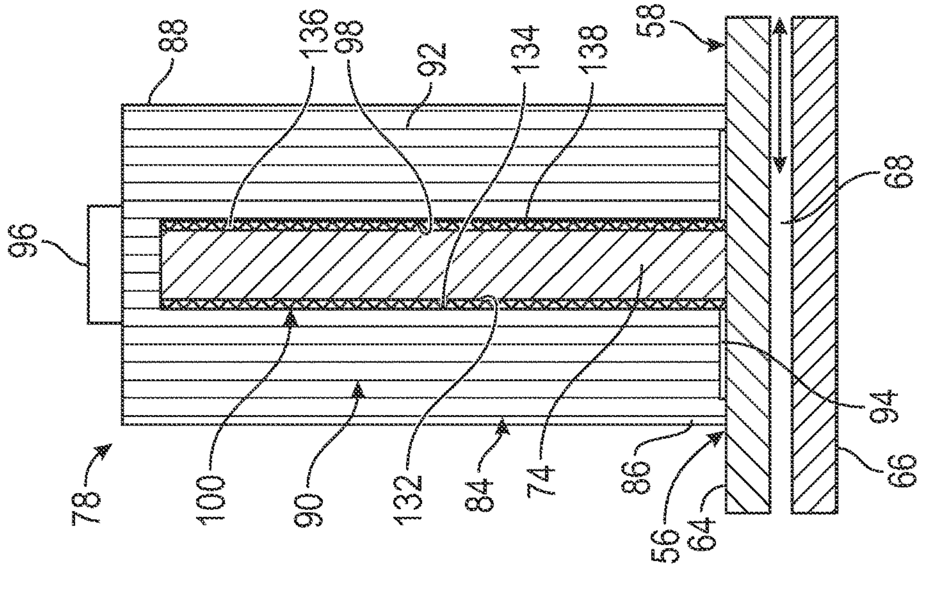
FIG. 6 is a cross-sectional view of an energy storage cell provided with an internal cooling structure connected to the coolant member, in accordance with another non-limiting example.

In another non-limiting example shown in FIG. 6, heat absorption member 100 includes an inner surface 132 having a plurality of threads 134. Fin 74 includes an outer surface 136 having a plurality of threads 138. With this arrangement, energy storage cell 78 may be threaded onto fin 74. In one non-limiting example, energy storage cell 78 may be secured to coolant member 56 such that first end 86 is in contact with first surface 64. In other non-limiting example, first end 86 may be spaced from first surface 64 and exposed to convective fluid currents.

Figure 7:
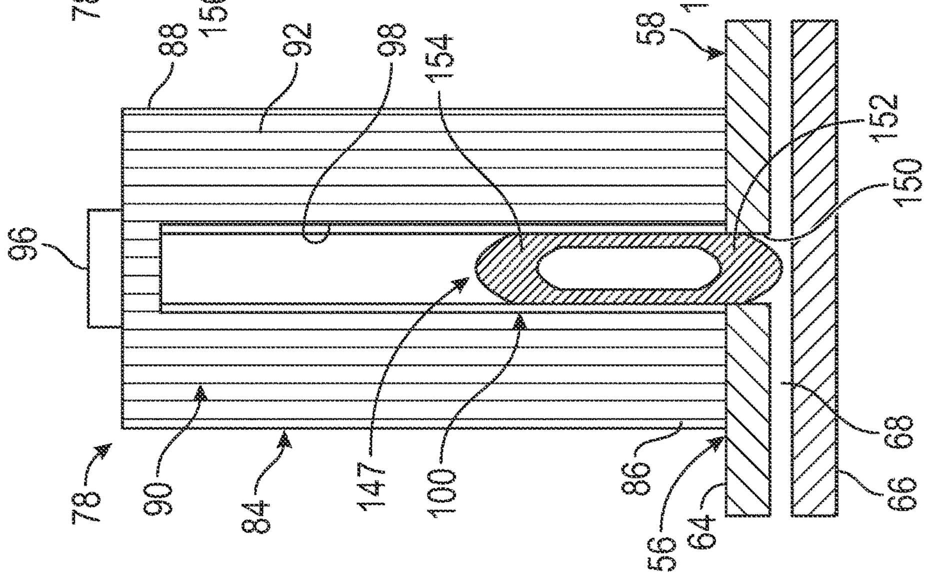
FIG. 7 is a cross-sectional view of an energy storage cell provided with an internal cooling structure connected to the coolant member, in accordance with yet another non-limiting example.

In the non-limiting example shown in FIG. 7, fin 74 is replaced by a heat pipe 147 that extends through an opening 150 formed in first surface 64 into heat absorption member 100. Heat pipe 147 includes a first end section 152 fluidically connected with a cooling fluid flowing through cooling fluid passage 68 and a second end section 154 that extends into heat absorption member 100. At this point, it should be understood that the term "heat pipe" defines a heat transfer device that employs a phase transition medium to transfer heat energy from one solid interface to another solid interface. As an alternative, other elements that include a phase change material or phase transition medium may be employed as a heat transfer medium. In either case, heat energy is transferred from an interface between second end section 154 and heat absorption member 100 and first end section 152 and the cooling fluid passing through cooling fluid passage 68.

Figure 8:
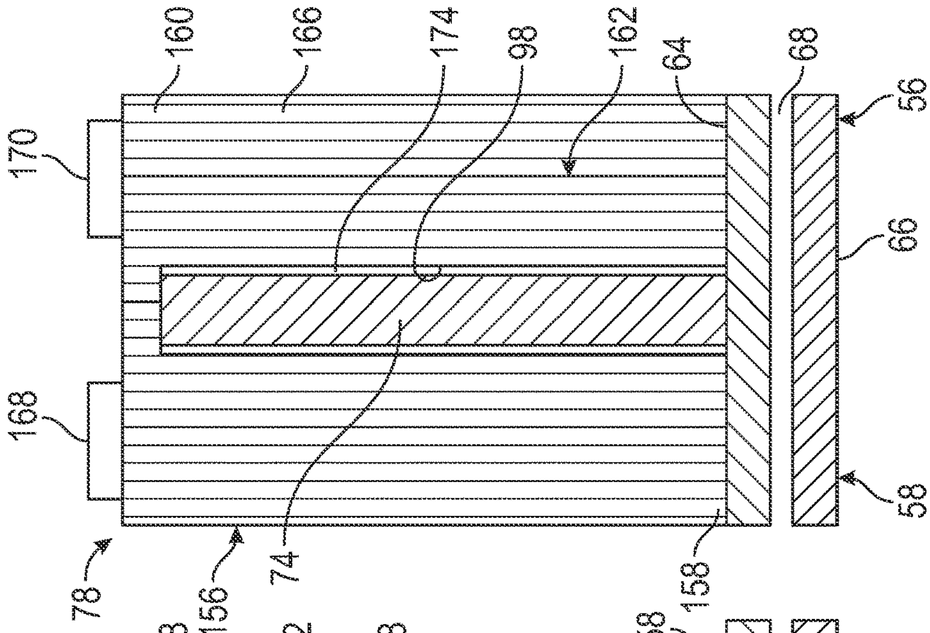
FIG. 8 is a cross-sectional view of an energy storage cell provided with an internal cooling structure connected to the coolant member, in accordance with still yet another non-limiting example.
Figure 9:
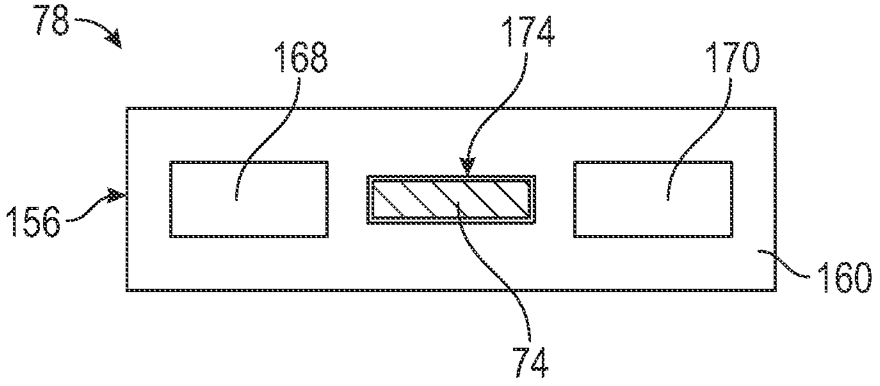
FIG. 9 is a top view of the energy storage cell of FIG. 8, in accordance with a non-limiting example.

At this point, it should be understood that the overall geometry of energy storage cell 78 may vary as may the location of the cathode and anode. For example, as shown in FIGS. 8 and 9, energy storage cell 78 may include a cell can 156 having a generally rectangular cross-section including a first end 158 and a second end 160. First end 158 is in heat transfer contact with first surface 64. An energy storage medium housing 162 is defined between first end 158 and second end 160. An amount of energy storage medium 166 is arranged in energy storage medium housing 162. Second end 160 supports both a first terminal or cathode 168 and a second terminal or anode 170. In the non-limiting example shown, a heat absorption member 174 extends into cell can 156 between cathode 168 and anode 170. Heat absorption member 174 is receptive of fin 74. The number, location, and orientation of heat absorption member 174 may vary.

At this point, it should be understood that the non-limiting examples presented herein describe a system for removing heat from internal portions of an energy storage device. Convective heat transfer from external surfaces is effective up to a point for reducing heat loads. Absorbing and removing heat that builds up internally contributes to further heat reduction which, in turn, enhances an overall operational efficacy and service life of the rechargeable energy storage system.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A rechargeable energy storage system comprising:

a housing including an interior zone;

a coolant member arranged in the interior zone of the housing; and a plurality of energy storage cells arranged in the interior zone on the coolant member, wherein each of the plurality of energy storage cells comprises:

a cell can defining an energy storage medium housing, the cell can including a first end supported at the coolant member and a second end;

an amount of energy storage medium arranged in the energy storage medium housing;

a heat absorption member extending from the first end toward the second end through the amount of energy storage medium; and a fin that is a solid structure extending from the coolant member into the heat absorption member along a first direction from a base of the fin positioned at the coolant member to a tip of the fin positioned opposite the base in the first direction, wherein the heat absorption member includes an inner surface having a plurality of inner threads, wherein the fin includes an outer surface having a plurality of outer threads that engage with the inner threads, the outer threads being in direct contact with the inner surface of the heat absorption member, and wherein the outer threads extend continuously from the base of the fin to the tip of the fin.

2. The rechargeable energy storage system according to claim 1, wherein the heat absorption member includes a conduit extending through the amount of energy storage medium.

3. The rechargeable energy storage system according to claim 2, wherein the conduit is formed from a thermally conductive material coated with an electrically insulative material.

4. The rechargeable energy storage system according to claim 2, wherein the coolant member includes a first surface, a second surface, and a cooling fluid passage arranged between the first surface and the second surface, the cooling fluid passage including an inlet, an outlet, the heat absorption member being in thermally conductive contact with one of the first surface and the second surface.

5. The rechargeable energy storage system according to claim 4, wherein the heat absorption member includes a first end portion connected to the first surface of the coolant member and a second end portion terminating in the cell can.

6. The rechargeable energy storage system according to claim 4, wherein the heat absorption member includes a first end portion fluidically connected to the cooling fluid passage and a second end portion that extends outwardly of the cell can.

7. The rechargeable energy storage system according to claim 4, wherein the fin extends from the one of the first surface and the second surface into the heat absorption member.

8. The rechargeable energy storage system according to claim 1, wherein the cell can includes a first terminal arranged at one of the first end and the second end, and a second terminal arranged at the other of the first end and the second end, the heat absorption member extending through each of the first terminal and the second terminal.

9. The rechargeable energy storage system according to claim 1, wherein the cell can includes a first terminal arranged at one of the first end and the second end, and a second terminal arranged at the one of the first end and the second end spaced from the first terminal.

10. A vehicle comprising:

a body;

an electric motor supported in the body; and a rechargeable energy storage system comprising:

a housing including an interior zone;

a coolant member arranged in the interior zone of the housing; and a plurality of energy storage cells arranged in the interior zone on the coolant member, wherein each of the plurality of energy storage cells comprises:

a cell can defining an energy storage medium housing, the cell can including a first end supported at the coolant member and a second end;

an amount of energy storage medium arranged in the energy storage medium housing;

a heat absorption member extending from the first end toward the second end through the amount of energy storage medium; and a fin that is a solid structure extending from the coolant member into the heat absorption member along a first direction from a base of the fin positioned at the coolant member to a tip of the fin positioned opposite the base in the first direction, wherein the heat absorption member includes an inner surface having a plurality of inner threads, wherein the fin includes an outer surface having a plurality of outer threads that engage with the inner threads, the outer threads being in direct contact with the inner surface of the heat absorption member, and wherein the outer threads extend continuously from the base of the fin to the tip of the fin.

11. The vehicle according to claim 10, wherein the heat absorption member includes a conduit extending through the amount of energy storage medium.

12. The vehicle according to claim 11, wherein the conduit is formed from a thermally conductive material coated with an electrically insulative material.

13. The vehicle according to claim 11, wherein the coolant member includes a first surface, a second surface, and a cooling fluid passage arranged between the first surface and the second surface, the cooling fluid passage including an inlet, an outlet, the heat absorption member being in thermally conductive contact with one of the first surface and the second surface.

14. The vehicle according to claim 13, wherein the heat absorption member includes a first end portion connected to the first surface of the coolant member and a second end portion terminating in the cell can.

15. The vehicle according to claim 13, wherein the heat absorption member includes a first end portion fluidically connected to the cooling fluid passage and a second end portion that extends outwardly of the cell can.

16. The vehicle according to claim 13, wherein the fin extends from the one of the first surface and the second surface into the heat absorption member.

17. The vehicle according to claim 10, wherein the cell can includes a first terminal arranged at one of the first end and the second end, and a second terminal arranged at the other of the first end and the second end, the heat absorption member extending through each of the first terminal and the second terminal.

18. The vehicle according to claim 10, wherein the cell can includes a first terminal arranged at one of the first end and the second end, and a second terminal arranged at the one of the first end and the second end spaced from the first terminal.

19. The rechargeable energy storage system according to claim 1, wherein at least some of the outer threads of the fin are positioned to overlap the amount of energy storage medium in a second direction orthogonal to the first direction.

20. The vehicle according to claim 10, wherein at least some of the outer threads of the fin are positioned to overlap the amount of energy storage medium in a second direction orthogonal to the first direction.

* * * * *